United States Patent [19]

Marshall et al.

[11] Patent Number: 5,417,019
[45] Date of Patent: May 23, 1995

[54] PASSTHROUGH DEVICE WITH FIRESTOP

[75] Inventors: David P. Marshall, Chagrin Falls; James A. Rajecki, Broadview Heights, both of Ohio

[73] Assignee: Lamson & Sessions Co.,, Cleveland, Ohio

[21] Appl. No.: 29,685

[22] Filed: Mar. 11, 1993

[51] Int. Cl.6 .................... F16K 17/38; F16K 13/00
[52] U.S. Cl. ...................................... 52/232; 52/220.8
[58] Field of Search ............................ 52/232, 220.8

[56] References Cited

U.S. PATENT DOCUMENTS

| | | |
|---|---|---|
| 3,848,897 | 11/1974 | McClellan . |
| 3,995,102 | 11/1976 | Kohaut . |
| 4,061,344 | 12/1977 | Bradley et al. . |
| 4,109,423 | 8/1978 | Perrain . |
| 4,136,707 | 1/1979 | Gaillot et al. . |
| 4,221,092 | 9/1980 | Johnson . |
| 4,272,643 | 6/1981 | Carroll et al. .......................... 52/232 |
| 4,307,546 | 12/1981 | Dolder . |
| 4,364,210 | 12/1982 | Fleming et al. . |
| 4,419,535 | 12/1983 | O'Hara . |
| 4,457,577 | 8/1984 | Licht . |
| 4,529,467 | 7/1985 | Ward et al. . |
| 4,538,389 | 9/1985 | Heinen . |
| 4,559,745 | 12/1985 | Wexler . |
| 4,583,565 | 4/1986 | Cornwall . |
| 4,607,469 | 12/1986 | Harrison ............................. 52/220.8 |
| 4,642,956 | 2/1987 | Harbeke . |
| 4,646,486 | 3/1987 | Hauff . |
| 4,669,759 | 6/1987 | Harbeke . |
| 4,724,858 | 2/1988 | Cornwall . |
| 4,748,787 | 6/1988 | Harbeke . |
| 4,796,401 | 1/1989 | Wexler . |
| 4,804,160 | 2/1989 | Harbeke . |
| 4,823,527 | 4/1989 | Harbeke . |
| 4,848,043 | 7/1989 | Harbeke . |
| 4,850,385 | 7/1989 | Harbeke . |
| 4,877,216 | 10/1989 | Harbeke . |
| 4,882,886 | 11/1989 | Harbeke . |
| 4,888,925 | 12/1989 | Harbeke . |
| 4,894,966 | 1/1990 | Balley et al. . |
| 4,901,488 | 2/1990 | Murota et al. . |
| 4,916,800 | 4/1990 | Harbeke . |
| 4,918,761 | 4/1990 | Harbeke . |
| 4,951,442 | 8/1990 | Harbeke, Jr. . |
| 4,953,235 | 9/1990 | Cornwall . |
| 5,058,341 | 10/1991 | Harbeke, Jr. . |
| 5,105,592 | 4/1992 | MacMillan et al. .................... 52/232 |
| 5,121,594 | 6/1992 | Wuertz ..................................... 52/232 |
| 5,155,957 | 10/1992 | Robertson et al. .................... 52/232 |
| 5,174,077 | 12/1992 | Murota ..................................... 52/232 |

Primary Examiner—Carl D. Friedman
Assistant Examiner—Wynn E. Wood
Attorney, Agent, or Firm—Fay, Sharpe, Beall, Fagan, Minnich & McKee

[57] ABSTRACT

A coupling device for installation in a building wall or floor to provide a passthrough opening for pipes, tubing, and the like comprises an axially elongated, plastic tubular housing with a radially extending mounting flange and having open first end and a second end which is closed by a transverse wall. At least one tubular coupling element having an entrance end and an exit end is positioned within the housing to extend axially thereof with the entrance end of the coupling opening to the first end of the housing. Intumescent firestop material surrounds the coupling element and fills the space between the coupling element and the outer housing. A tube member extends from the coupling element to the second end of the housing. After the coupling device is installed, the second end of the housing is cut away at the surface level of the partition to expose the tube member for connection to the associated piping system.

19 Claims, 4 Drawing Sheets

PASSTHROUGH DEVICE WITH FIRESTOP

BACKGROUND OF THE INVENTION

The subject invention is directed toward the art of piping and conduit systems and devices and, more particularly, to a coupling device for forming pipe and conduit passthrough openings in building partitions.

During construction of buildings, it is necessary to provide openings through the building floors and walls to permit running of piping, conduit, and cable systems. Many different types of fitting and coupling devices have been used for this purpose. These devices have varied from simple removable forms to permanently installed boxes and housings of complex design.

Generally, however, whether of simple or complex design, the currently available devices are often very labor intensive. Their labor intensive nature is particularly evident during the installation of the code required firestop materials after the piping and conduit systems have been installed. Typically, it has been necessary to caulk or trowel intumescent materials about the pipes and conduits where they pass through the partition fitting and coupling devices.

BRIEF STATEMENT OF THE INVENTION

The subject invention provides a coupling device which overcomes the noted problems by having the firestop material incorporated into the device prior to the time the device is installed in the building. Thus, merely installing the coupling device in the original construction provides a passthrough opening with the necessary firestop material already in place. Subsequent caulking or troweling of such materials about the pipe and conduits which are installed therein is not required. Likewise, the installation of separate firestop collars or similar device is not required.

In accordance with the invention, a coupling device is provided for installation in the building partition to provide a passthrough opening for conduits, pipes, and the like. The device comprises an axially elongated, tubular outer housing having first and second ends with the first end open and the second end preferably closed by a transverse end wall. A laterally extending flange is provided about the exterior of the housing for mounting the housing in an opening extending through the partition. At least one tubular pipe coupling element having an entrance end and an exit end is positioned within the housing to extend axially thereof with the entrance end of the coupling opening to the first end of the housing. An intumescent firestop material surrounds the coupling element and generally fills the space between the coupling element and the outer housing. A tube member extends from the coupling element to the second end of the housing.

Preferably, the tubular outer housing is formed of plastics material and the tube member extends from the coupling element substantially to the second end of the housing adjacent the transverse end wall which closes the second end.

It is preferred that the area surrounding the tube member and between the intumescent firestop material and the transverse end wall be filled with a filler material, such as a foam plastic which acts to locate and position the tube member.

According to a more limited aspect of the invention, the tubular pipe coupling element has a cylindrical entrance end with a seal means positioned therein for sealingly engaging the exterior of a pipe inserted into the coupling element while permitting free axially sliding movement for positioning and adjusting of the pipe.

In use, the device can be inserted into a preformed opening and mounted therein through the use of the laterally extending flange. Alternatively, the flange can be used to mount the coupling device directly to partition forms or deck panels and the wall or floor poured in place about the device. Thereafter, the closed end of the device can be cut off at the surface level of the floor or wall to provide access to the tube member which extends from the coupling element toward this second end of the housing. The interior of the device is, however, enclosed and protected during the construction operations such as floor pouring and is not exposed until it is time to install the piping or conduits through the coupling device.

In accordance with a more limited aspect of the invention, it is contemplated that a metal plate member can be joined to the open first end of the tubular outer housing. The plate member preferably has at least one central open area corresponding to the locations of the entrance ends of the pipe coupling elements within the housing to allow free access thereto. The periphery of the plate member is arranged to extend laterally beyond the open end of the tubular housing. The plate member thus prevents the device from being driven from the mounted position by impact by high pressure streams used in combating fires. That is, the metal flange portion will not melt under normal fire conditions and extends radially to a position beyond the edge of the mounting hole to prevent the device from being driven through the wall when impacted.

As can be seen from the foregoing, a primary object of the invention is the provision of a self-contained coupling device which can be used to provide passthroughs for any types of pipes, tubular conduits, and cable systems while providing a firestop installation.

Yet another object is the provision of a device of the type described wherein the firestop material is installed and in place at the same time that the device is installed in the building project.

A further object of the invention is the provision of a device of the type described wherein it is not necessary to have workmen return to the construction site after the piping has been installed for the purpose of installing firestop material.

Yet another object of the invention is the provision of a device of the type described which can be formed from plastics materials and readily and simply installed to provide any desired type of conduit and pipe passthrough.

A still further object is the provision of a coupling device of the type described wherein the internal components are protected during much of the building construction period.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
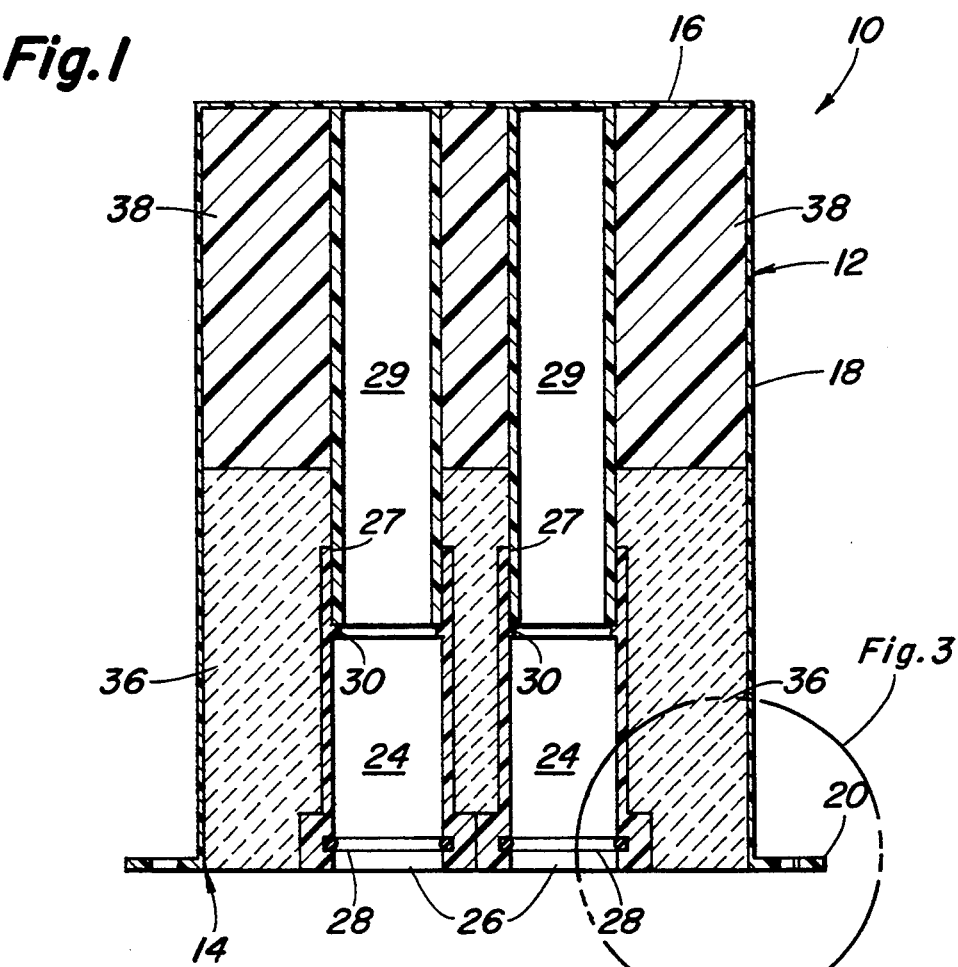
FIG. 1 is a vertical cross-sectional view through a coupling device formed in accordance with a preferred embodiment of the invention.
Figure 2:
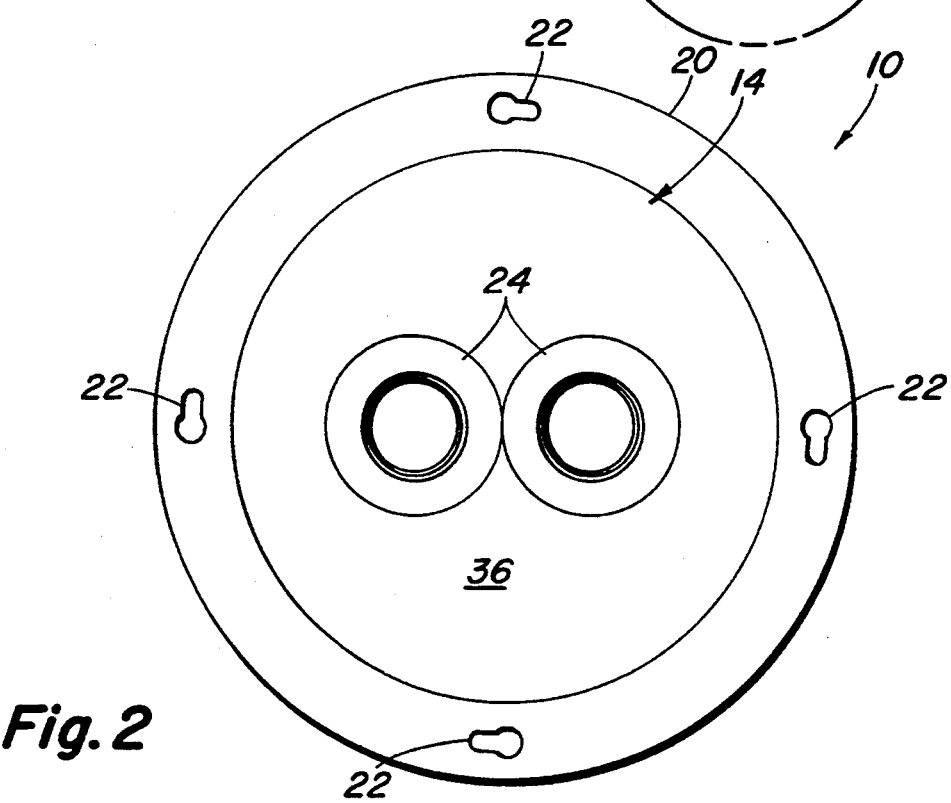
FIG. 2 is a bottom plan view of the device of FIG. 1.
Figure 3:
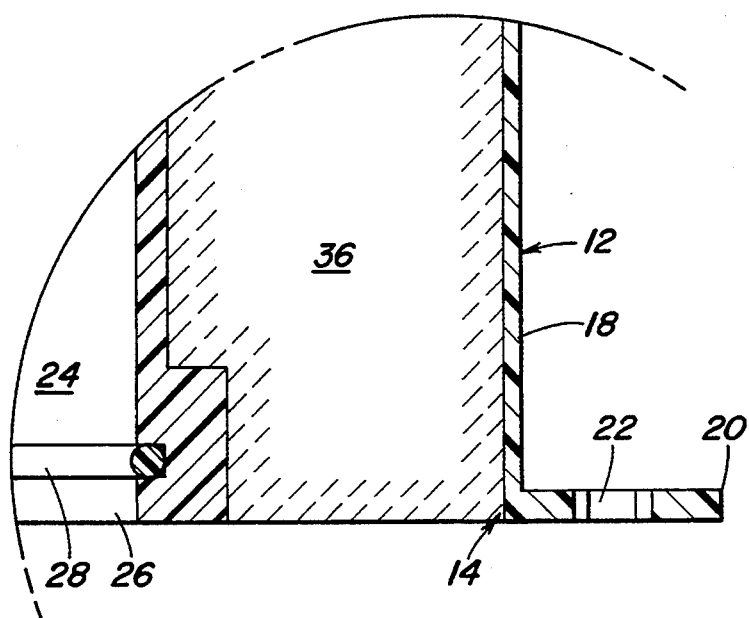
FIG. 3 is a greatly enlarged view of the circled area of FIG. 1.

Referring more particularly to the drawings wherein the showings are for the purpose of illustrating preferred and alternate embodiments of the invention only, and not for the purpose of limiting same, FIGS. 1 through 3 best show the overall arrangement of a preferred coupling device 10 comprising an outer housing 12 of generally tubular shape and having an open lower or first end 14 and a closed upper or second end 16. The housing 12 is preferably formed from a suitable plastics material, such as PVC or any suitable ABS plastic or the like. The side wall 18 of the tubular housing is relatively thin and, in the subject embodiment, has a circular cross-section. However, as can be readily understood, the actual cross-sectional shape of the housing is not important and could vary significantly. Positioned about the open first end 14 of the housing 12 is a laterally extending, integral flange 20 which is circumferentially continuous and provides means for mounting the device in a manner subsequently to be described. As best seen in FIG. 2, the mounting flange 20 preferably includes circumferentially spaced openings 22 which can be provided to facilitate mounting of the assembly through the use of conventional nails, screws, or the like. It should be noted that the openings 22 are shown as having somewhat of a key-hole shape so as to permit selective removal of the device from standard headed fasteners by a slight rotation to align the openings with the head of the fastener.

Upper end wall 16 extends transverse to the longitudinal axis of the coupling device 10 and generally perpendicular to the side wall 18. Additionally, in this embodiment, the end wall 16 is integral with the side wall 18 and is preferably completely closed and imperforate. Under certain conditions, the end wall 16 could be integral or a separate applied element.

Extending axially within housing 12 are a pair of tubular coupling elements 24. Although two couplings are shown, it is clear that any number of such couplings of any particular size or combination of sizes could be provided as desired. In the subject embodiment, each of the couplings 24 are a tubular slip coupling design having an entrance end 26 and an exit end 27. The couplings 24 are positioned with their entrance ends opening to the first, open end 14 of the housing. In the embodiment under consideration, a circumferential seal element in the form of an O-ring 28 is positioned in a suitable groove formed about the entrance end of the coupling 24. The upper or exit end 27 of each coupling 24 is joined with a tube member 29 which extends from the respective coupling element 24 to a position closely adjacent the second end of the housing 12. As can be appreciated, the tubular element 29 can be an integral part of the associated coupling 24 or it can be joined thereto in the manner shown by a slip fit to a locating flange portion 30. The juncture between the coupling 24 and the associated tube 28 can be bonded or sealed in any convenient manner, if desired.

Preferably, the individual tubular pipe coupling elements 24 and the associated tube members 29 are formed from suitable, conventional plastics material such as PVC and have a circular cross-section as best seen in FIG. 2.

The coupling elements 24 are surrounded and enclosed by intumescent firestop material which fills the space between the coupling elements and the outer housing 12. Any of many commercially available intumescent firestop compounds could be used at the location shown. Specifically, as can be best seen in FIG. 1, the firestop material 36 extends beyond the inner end of the individual coupling members to a point well up the length of the tube members 29. The firestop material thus locates and positions the coupling members within the outer housing. The space about the upper ends of the tubular members 29 and between the firestop material 36 and the end wall 16 is preferably filled by a filler material 38, such as a foamed plastic or other lightweight solid material. The filler material 38 further locates the tubes 29 and acts to protect the tubes 29 and strengthen the housing 12.

To use the device shown in FIGS. 1 through 3, it is, of course, possible to merely form an opening through a pre-existing wall structure and insert the device therethrough with the radially extending flange 20 engaging the edges of the opening and preventing further movement of the device through the wall opening. The flange can then be nailed or otherwise secured to the area surrounding the opening. On the opposite side of the wall or partition, the closed end of the housing 12 can be cut away to a level corresponding to the surface of the wall with the tubes 29 exposed for connection with associated piping or the like.

Figure 4:
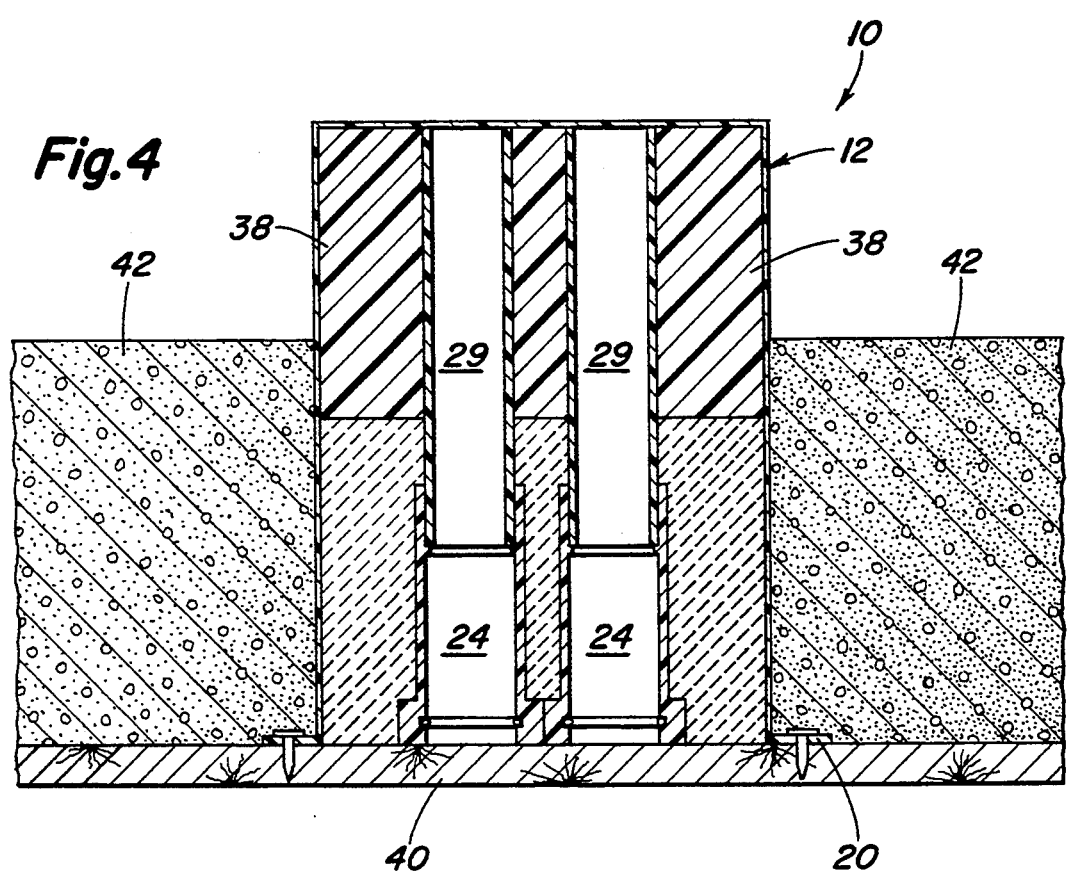
FIG. 4 shows the device of FIG. 1 in place on a building deck form with the concrete floor structure poured in place about the coupling device.
Figure 5:
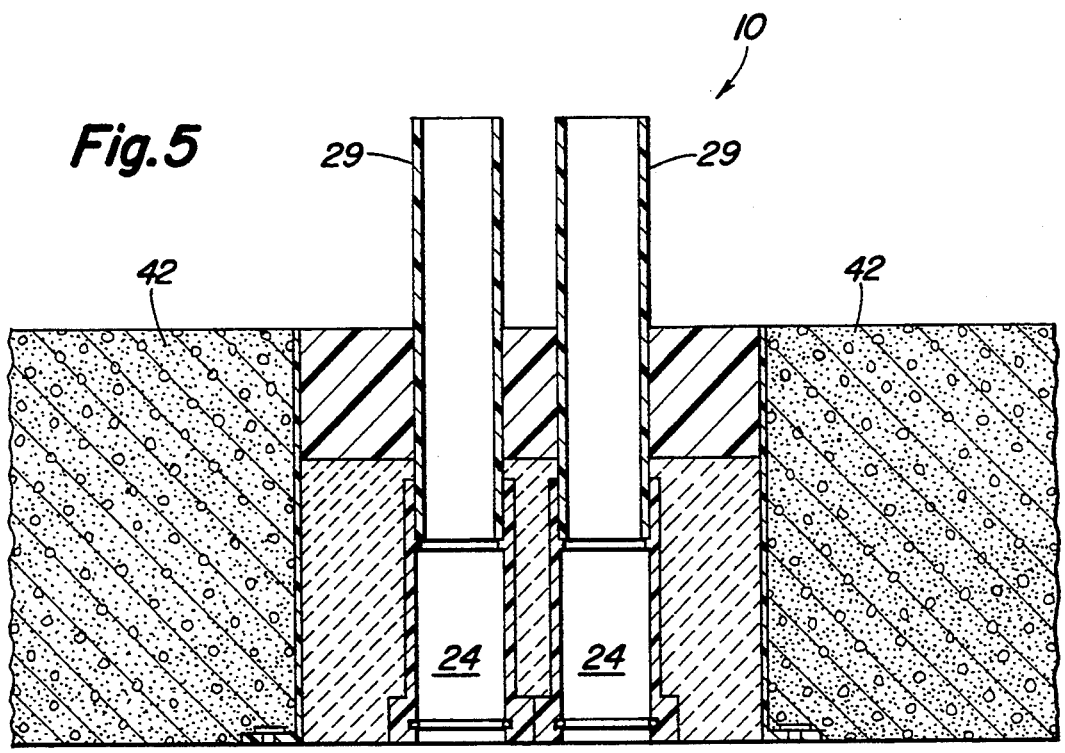
FIG. 5 is a view similar to FIG. 4 but showing the device after the closed end has been removed to provide access to the ends of the interior coupling elements.

Alternatively, as shown in FIGS. 4 and 5, the device can be used during the actual construction of a partition, such as a floor or wall panel. In such an instance, the coupling device 10 is nailed or otherwise connected in a located position on the form or deck 40. Thereafter, the wall or floor concrete 42 is poured into position as shown in FIG. 4. Subsequently, as shown in FIG. 5, the form member 40 is removed and the upper end of the casing 12 and the surrounding filler material is removed leaving the tubes 29 exposed for connection with the associated building piping system. The intumescent firestop material is in position such that should a fire break out, the expansion of the material closes off the opening and the thereby prevent smoke or fire from traveling through the partition.

Figure 6:
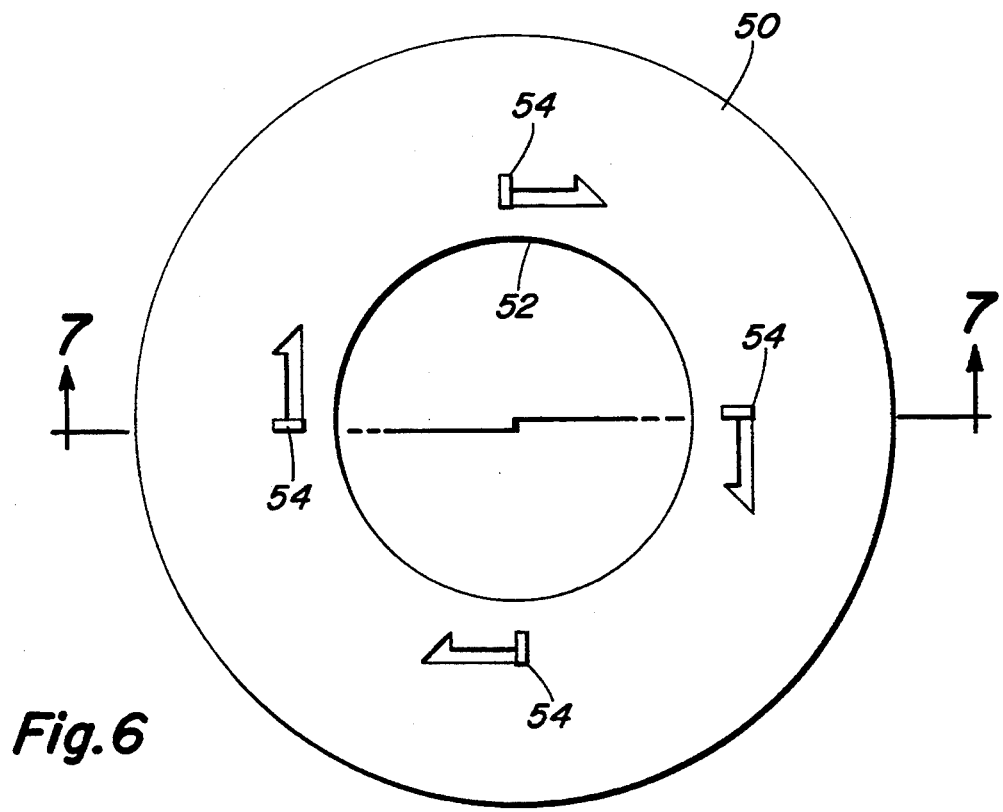
FIG. 6 is a plan view of a metal disk member used in conjunction with the device of FIG. 1.
Figure 7:
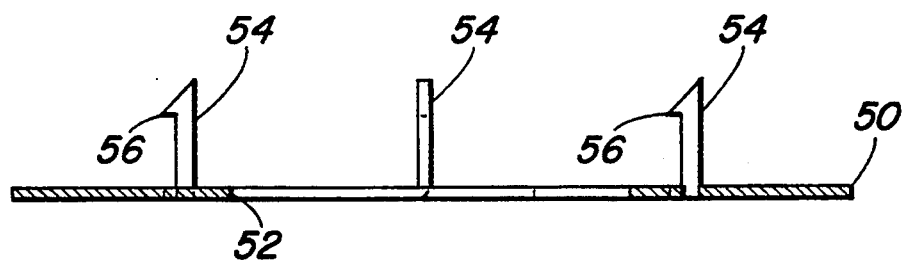
FIG. 7 is a cross-sectional view taken on line 7—7 of FIG. 6.
Figure 8:
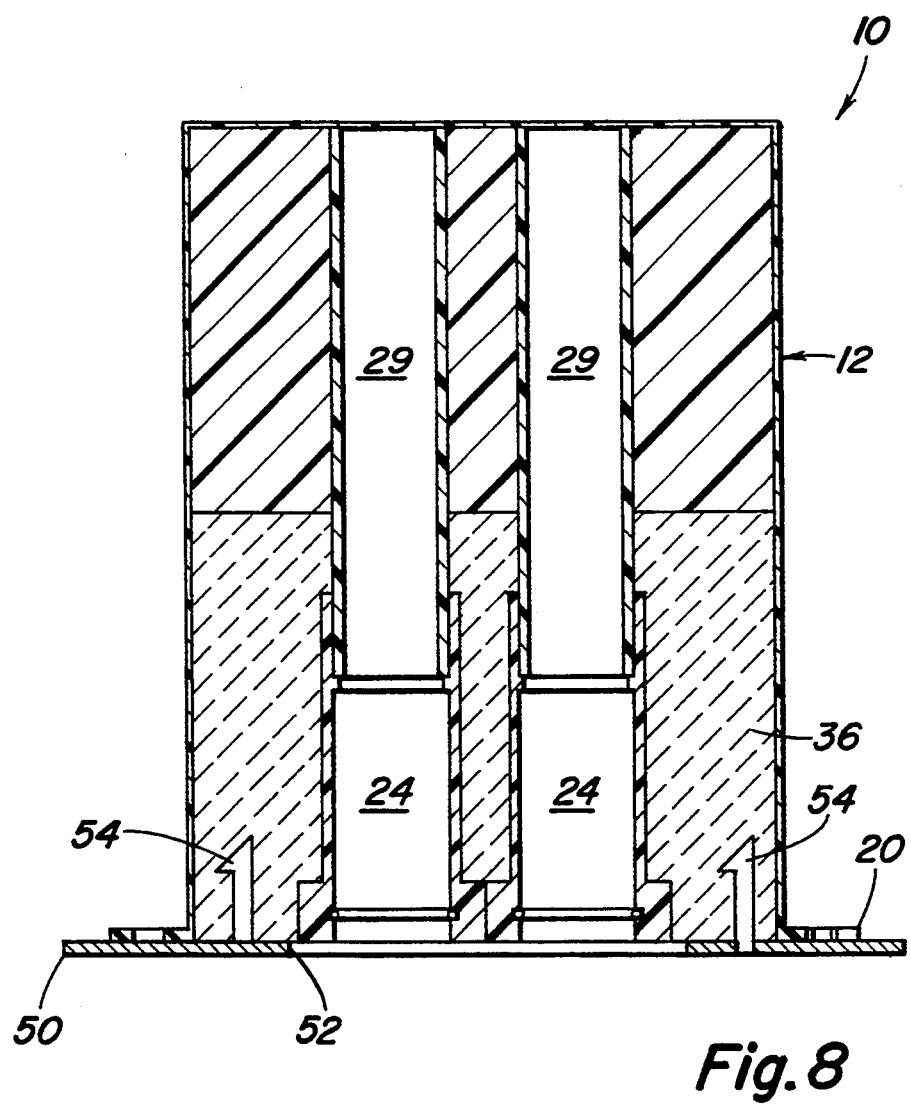
FIG. 8 is a view similar to FIG. 1 but showing the metal disk member of FIGS. 6 and 7 in position on the entrance end of the coupling device.

FIGS. 6 through 8 illustrate a modified form of the invention wherein a metal disk member 50 is arranged for mounting in conjunction with the device 10 to prevent it from being expelled through the opening when impacted by a high pressure water jet which may be used in fighting fires in the building. As shown in FIGS. 6 and 7, the metal disk 50 is of a size such as to have an outer peripheral extent greater than the open end of the housing 12. A center opening 52 is formed through the disk so that it allows free access to the entrance ends of the individual coupling members 24. Referring to FIG.

8, the disk member has a maximum size which is preferably at least as great as the flange 20 on the coupling device 10. Additionally, as shown in FIGS. 6 and 7, the disk 50 is provided with fastening means which allow it to be connected to the coupling device 10. These means could take many forms, but in the subject embodiment, they comprise arrow-shaped stampings which, as shown in FIG. 6, are stamped from the body of the disk and bent to extend upwardly as best seen in FIG. 7. These stampings identified with the numeral 54 have a pointed upper end and a laterally extending tine 56 such that they can be driven into the intumescent firestop material to hold the disk 50 in place overlying the flange 20.

As can be appreciated, the disk 50 can be put into position prior to installation of the device 10 or at some later time after the forms 40 have been removed.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A coupling device for installation in a building partition to provide a passthrough for conduits, pipes, and the like, said device comprising:
   an axially elongated tubular outer housing formed of plastic and having first and second ends with the first end open and the second end closed by a transversely extending wall;
   a laterally extending flange means extending outwardly from the housing for mounting the housing in an opening extending through the partition;
   at least one tubular pipe coupling element having an entrance end and an exit end is positioned within the housing to extend axially thereof with the entrance end of the coupling facing toward the first end of the housing;
   an intumescent firestop material surrounding said coupling element and generally filling the space between the coupling element and the outer housing; and,
   a tube member extending from the coupling element to the second end of the housing.

2. The coupling device as defined in claim 1 wherein the tube member extending from the coupling element extends substantially to the transversely extending wall.

3. The coupling device as defined in claim 2 including a solid filler material surrounding said tube member and substantially filling the space between the intumescent firestop material and the transverse wall.

4. The coupling device as defined in claim 3 wherein the tubular pipe coupling element has a cylindrical entrance end with a seal means positioned therein for sealingly engaging the exterior of a pipe inserted into said coupling while permitting free axial sliding movement of the pipe.

5. The coupling device as defined in claim 4 wherein there are a plurality of tubular coupling elements mounted within the tubular housing to extend axially thereof.

6. The coupling device as defined in claim 4 wherein the tubular outer housing is formed of plastics material and wherein the second end is closed by a transverse wall.

7. The coupling device as defined in claim 5 wherein the tubular outer housing is generally cylindrical and solid filler material fills the space between the transversely extending end wall and the intumescent firestop material.

8. The coupling device as defined in claim 7 wherein the laterally extending flange means is located closely adjacent the open first end of the tubular outer housing.

9. The coupling device as defined in claim 5 wherein all of the tubular coupling elements extend parallel to the axis of the tubular outer housing.

10. The coupling device as defined in claim 7 wherein the solid filler material is a foam plastic and is readily removable from the tubular outer housing.

11. The coupling device as defined in claim 7 including a metal plate member joined to the open first end of the tubular outer housing, said plate member having at least one central open area corresponding to the locations of the entrance ends of the pipe coupling elements to allow free access thereto.

12. The coupling device as defined in claim 11 wherein the metal plate member has peripheral edge portions extending laterally beyond the open end of the tubular outer housing.

13. The coupling device as defined in claim 11 wherein the metal plate member is joined to the open first end of the tubular outer housing by fasteners extending into the intumescent firestop material.

14. The coupling device as defined in claim 13 wherein the fasteners are integral portions of the metal plate.

15. The coupling device as defined in claim 13 wherein the transverse end wall is formed integrally with the tubular outer housing.

16. A coupling device for installation in a building partition to provide a passthrough for pipes, tubing, and the like, said device comprising:
   an axially elongated tubular outer housing having first and second ends with the first end open and the second end closed by a transverse wall;
   a laterally extending flange means for mounting the housing in an opening extending through the partition;
   at least one tubular coupling element having an entrance end and an exit end and positioned within the housing to extend axially thereof with the entrance end of the coupling facing toward the first end of the housing;
   an intumescent firestop material surrounding said coupling element and generally filling the spaced between the coupling element and the outer housing; and,
   a tube member extending from the coupling element to the second end of the housing.

17. The coupling device as defined in claim 16 wherein the tubular outer housing comprises a one piece body formed of plastics material and the tube member extending from the coupling element extends substantially to the transverse wall.

18. The coupling device as defined in claim 17 including a filler material surrounding said tube member and substantially filling the space between the intumescent firestop material and the transverse wall.

19. The coupling device as defined in claim 18 wherein the tubular pipe coupling element has a cylindrical entrance end with a seal means positioned therein for sealingly engaging the exterior of a pipe inserted into said coupling element while permitting free axial sliding movement of the pipe.

* * * * *